US00RE47176E

(19) United States
(12) Reissued Patent
Rehkemper et al.

(10) Patent Number: US RE47,176 E
(45) Date of Reissued Patent: Dec. 25, 2018

(54) PROPELLERS AND PROPELLER RELATED VEHICLES

(71) Applicant: Rehco, LLC, Chicago, IL (US)

(72) Inventors: Jeffrey Rehkemper, Chicago, IL (US); Keith Johnson, Roberts, WI (US); Nicholas Grisolia, Lake Geneva, WI (US)

(73) Assignee: Rehco, LLC, Chicago, IL (US)

(21) Appl. No.: 14/136,854

(22) Filed: Dec. 20, 2013

Related U.S. Patent Documents

Reissue of:

(64) Patent No.: 6,659,395
Issued: Dec. 9, 2003
Appl. No.: 10/189,681
Filed: Jul. 8, 2002

U.S. Applications:

(63) Continuation-in-part of application No. 29/158,997, filed on Apr. 15, 2002, now Pat. No. Des. 506,178, (Continued)

(51) Int. Cl.
*B64C 27/32* (2006.01)
*B64C 27/43* (2006.01)

(Continued)

(52) U.S. Cl.
CPC ..... *B64C 27/32* (2013.01); *A63H 27/12* (2013.01); *B64C 27/14* (2013.01); *B64C 27/43* (2013.01); *B64C 27/473* (2013.01); *B64C 27/52* (2013.01)

(58) Field of Classification Search
CPC ..... B64C 27/43; B64C 27/41; B64C 27/52; B64C 27/32; B64C 27/08; B64C 27/12;

(Continued)

(56) References Cited

U.S. PATENT DOCUMENTS 1,366,736 A * 1/1921 Krause ..... 446/42
1,491,997 A * 4/1924 Messick ..... 416/141

(Continued)

FOREIGN PATENT DOCUMENTS

AU 2002352512 B2 5/2003
CA 2431661 A1 5/2003

(Continued)

OTHER PUBLICATIONS

Trademark Publication EM 000062088-0001 A1, published Dec. 23, 2003, Office for Harmonization in the Internal Market (OHIM)—European Union Community Trademark Office.

(Continued)

*Primary Examiner* — Peter C English

(74) *Attorney, Agent, or Firm* — Adam K. Sacharoff; Much Shelist, P.C.

(57) ABSTRACT

A propeller related vehicle in accordance with one embodiment of the present invention is described as a helicopter having an airframe housing a motor mechanism for powering a main propeller attached to a main drive shaft that extends vertically through the airframe and for powering a tail rotor. The helicopter further includes a horizontal stabilizing mechanism attached between the main propeller and the main drive shaft, which permits the main propeller to freely pivot about the main drive shaft independently from the airframe. As such when the main propeller is rotating and the main propeller begins to pitch, the rotating main propeller has a centrifugal force created by the rotation thereof and will tend to pivot about the horizontal stabilizing mechanism in a manner that offsets the pitch such that the helicopter remains in a substantially horizontal position. In addition various main propeller configurations may be employed that provide additional self-stabilization.

15 Claims, 9 Drawing Sheets

Amended

Related U.S. Application Data and a continuation-in-part of application No. 29/158,996, filed on Apr. 15, 2002, now Pat. No. Des. 503,142.

(60) Provisional application No. 60/348,891, filed on Jan. 14, 2002, provisional application No. 60/337,670, filed on Nov. 7, 2001.

(51) Int. Cl.

| | |
|---|---|
| ***B64C 27/52*** | (2006.01) |
| ***B64C 27/473*** | (2006.01) |
| ***B64C 27/14*** | (2006.01) |
| ***A63H 27/133*** | (2006.01) |
| ***A63H 27/00*** | (2006.01) |

(58) Field of Classification Search

CPC ..... B64C 27/14; B64C 27/46; B64C 27/473; B64C 11/343; B64C 11/346; A63H 27/12; A63H 27/02; A63H 30/04

USPC ..... 416/18, 139, 141, 227 A, 231 R; 244/17.19, 17.11, 17.23; 446/37, 36, 57, 446/58; D21/442

See application file for complete search history.

(56) References Cited

U.S. PATENT DOCUMENTS

| | | | | | |
|---|---|---|---|---|---|
| 2,074,342 | A | * | 3/1937 | Platt | 244/17.21 |
| 2,382,347 | A | * | 8/1945 | Streater | 446/42 |
| 2,384,516 | A | | 9/1945 | Young | |
| 2,388,653 | A | * | 11/1945 | Hays | 416/114 |
| 2,429,502 | A | * | 10/1947 | Young | 244/17.17 |
| 2,510,006 | A | * | 5/1950 | Young | 416/139 |
| D158,936 | S | * | 6/1950 | Crowder | D21/442 |
| 2,552,651 | A | * | 5/1951 | Skold | 416/204 R |
| 2,597,688 | A | * | 5/1952 | Vought | 366/67 |
| 2,633,924 | A | * | 4/1953 | Young | 416/18 |
| D169,558 | S | * | 5/1953 | Nagler | D21/442 |
| 2,646,848 | A | | 7/1953 | Young | |
| 2,684,122 | A | * | 7/1954 | Perry | 416/18 |
| 2,731,767 | A | * | 1/1956 | Holt | 244/17.11 |
| 3,108,641 | A | * | 10/1963 | Taylor | 416/18 |
| 3,135,334 | A | * | 6/1964 | Culver | 416/18 |
| 3,199,603 | A | * | 8/1965 | Margolis | 416/227 A |
| 3,857,194 | A | * | 12/1974 | Guttman | 446/36 |
| D250,966 | S | * | 1/1979 | Spore | D21/442 |
| 4,604,075 | A | | 8/1986 | Richards et al. | 446/232 |
| 4,728,311 | A | * | 3/1988 | Magers | 446/228 |
| 4,781,642 | A | * | 11/1988 | Stanzel | 446/38 |
| 5,252,100 | A | | 10/1993 | Osawa et al. | 446/44 |
| 5,370,341 | A | | 12/1994 | Leon | 244/17.11 |
| 5,381,988 | A | | 1/1995 | Kattas | 244/153 A |
| 5,609,312 | A | | 3/1997 | Arlton et al. | 244/17.11 |
| 5,628,620 | A | * | 5/1997 | Arlton | 446/37 |
| 5,672,086 | A | * | 9/1997 | Dixon | 446/37 |
| 5,836,545 | A | | 11/1998 | Arlton et al. | 244/60 |
| 5,879,131 | A | | 3/1999 | Arlton et al. | 416/223 |
| 6,086,016 | A | * | 7/2000 | Meek | 244/17.19 |
| 6,182,923 | B1 | | 2/2001 | Weinhart | 244/17.25 |
| 6,612,893 | B2 | * | 9/2003 | Rehkemper et al. | 446/57 |
| 6,659,395 | B2 | | 12/2003 | Rehkemper et al. | |
| 6,732,973 | B1 | | 5/2004 | Rehkemper | |
| 6,758,436 | B2 | | 7/2004 | Rehkemper et al. | |
| D503,142 | S | | 3/2005 | Rehkemper et al. | |
| D503,198 | S | | 3/2005 | Rehkemper et al. | |
| D506,178 | S | | 6/2005 | Rehkemper et al. | |
| 7,178,758 | B2 | | 2/2007 | Rehkemper | |

FOREIGN PATENT DOCUMENTS

| | | | | |
|---|---|---|---|---|
| CN | 1558853 | A | | 12/2004 |
| CN | 1318263 | C | | 5/2007 |
| DE | 60208929 | T2 | | 7/2006 |
| EP | 1441945 | B1 | | 1/2006 |
| GB | 751837 | A | * | 7/1956 |
| JP | 3733366 | B2 | | 1/2006 |
| MX | 03005415 | A | | 2/2005 |

OTHER PUBLICATIONS

Front page of HK 1070628 B (The Hong Kong Special Administrative Region of the People's Republic of China), published Jun. 24, 2005, and corresponding to CN 1318263 C.

* cited by examiner

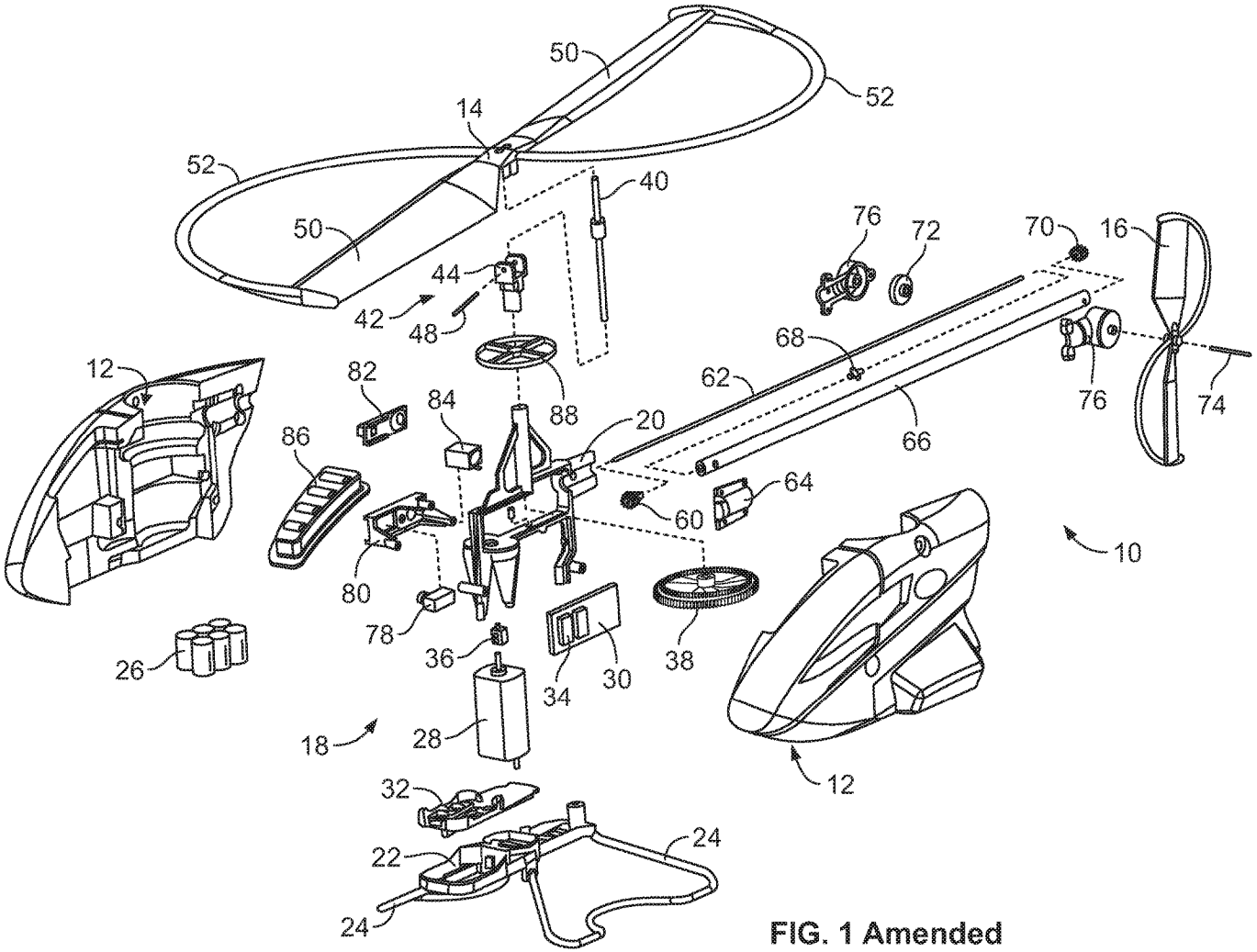
FIG. 1 Amended

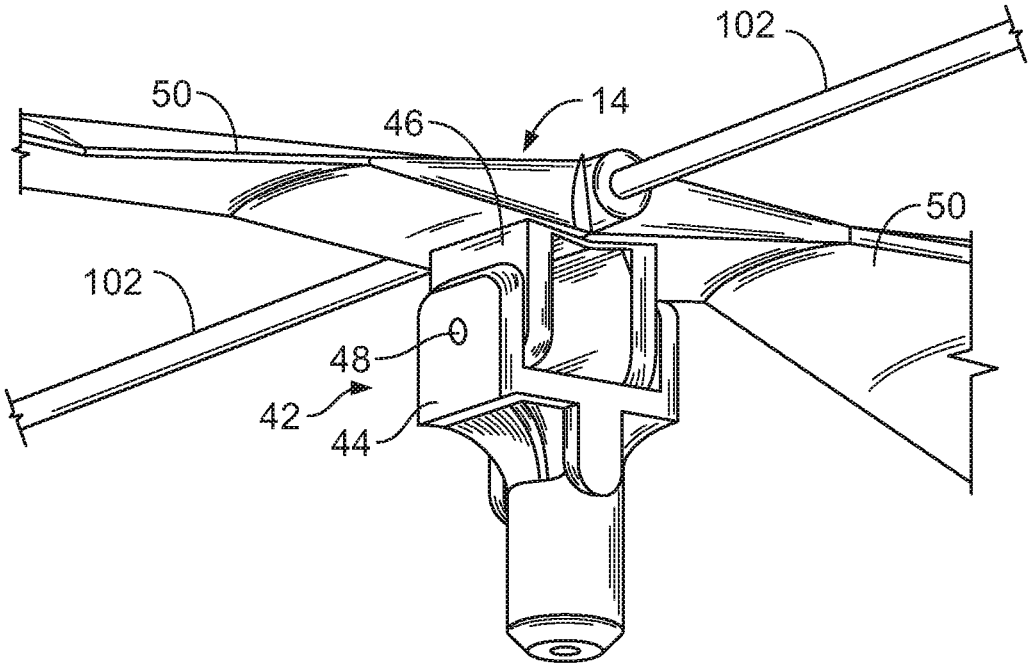
FIG. 2 Amended

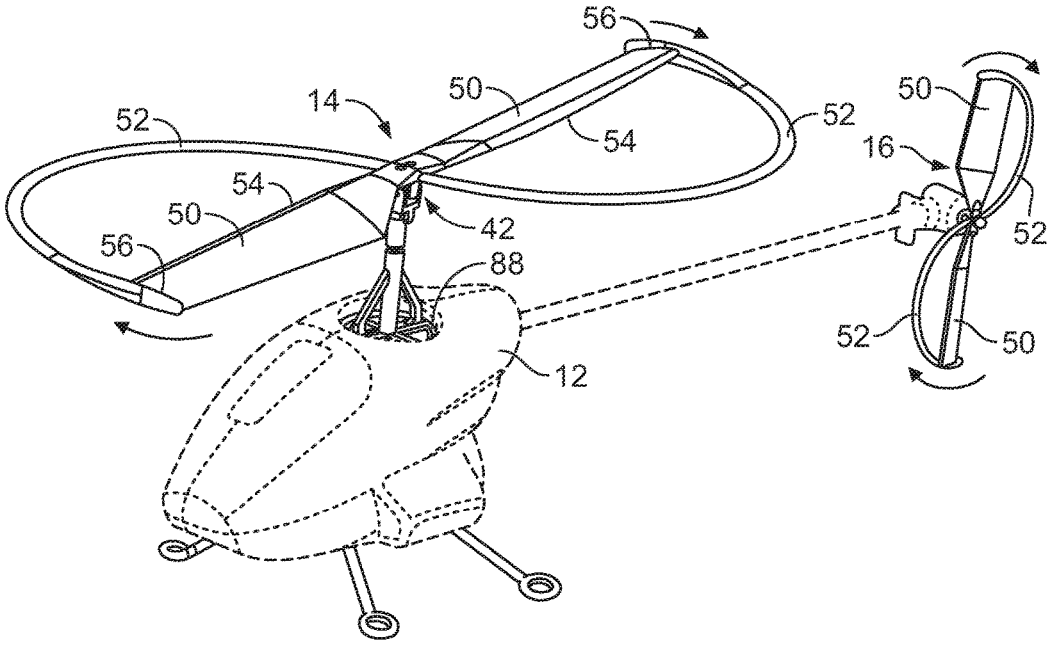
FIG. 3 Amended

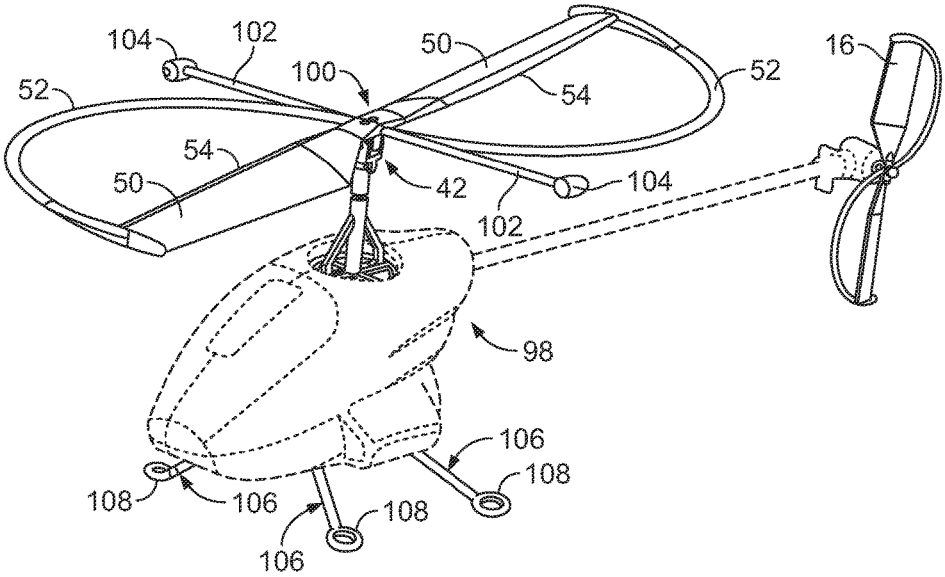
FIG. 4 Amended

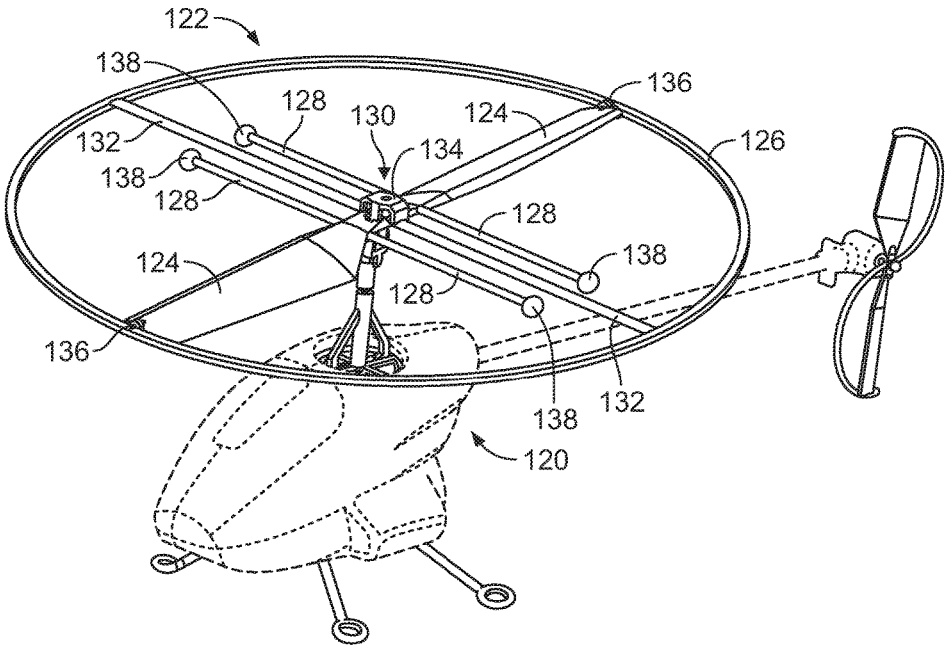
FIG. 5 Amended

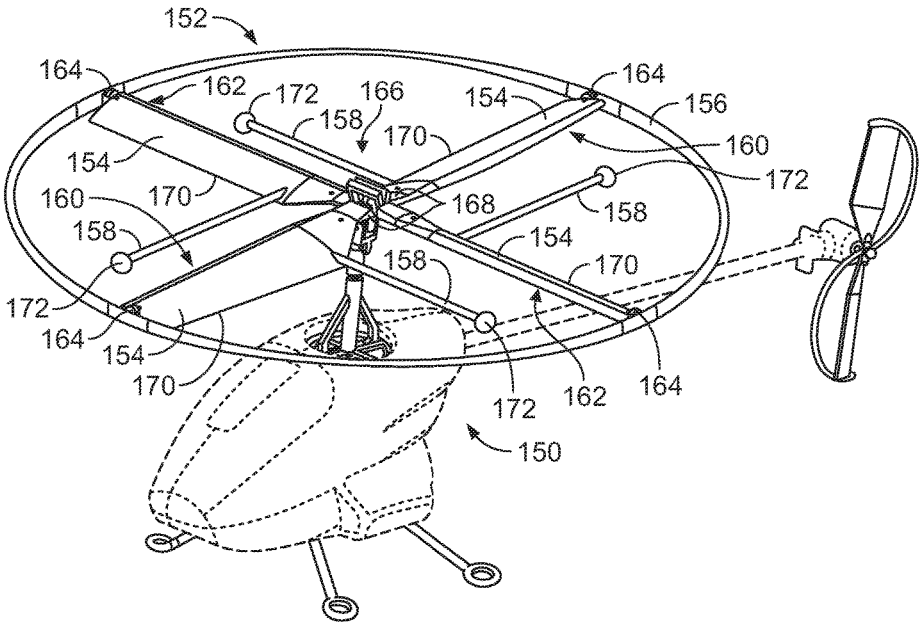
FIG. 6 Amended

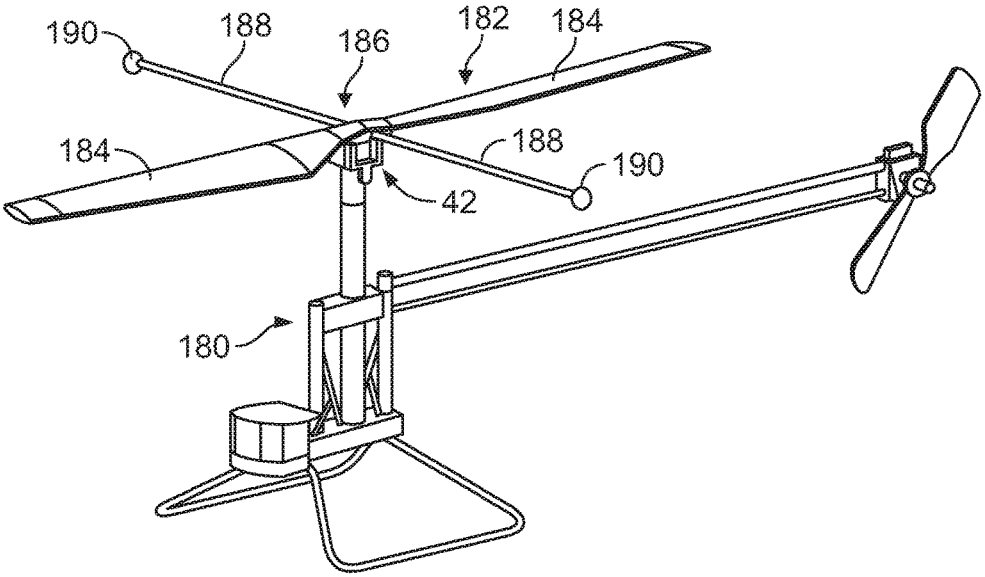
FIG. 7 Amended

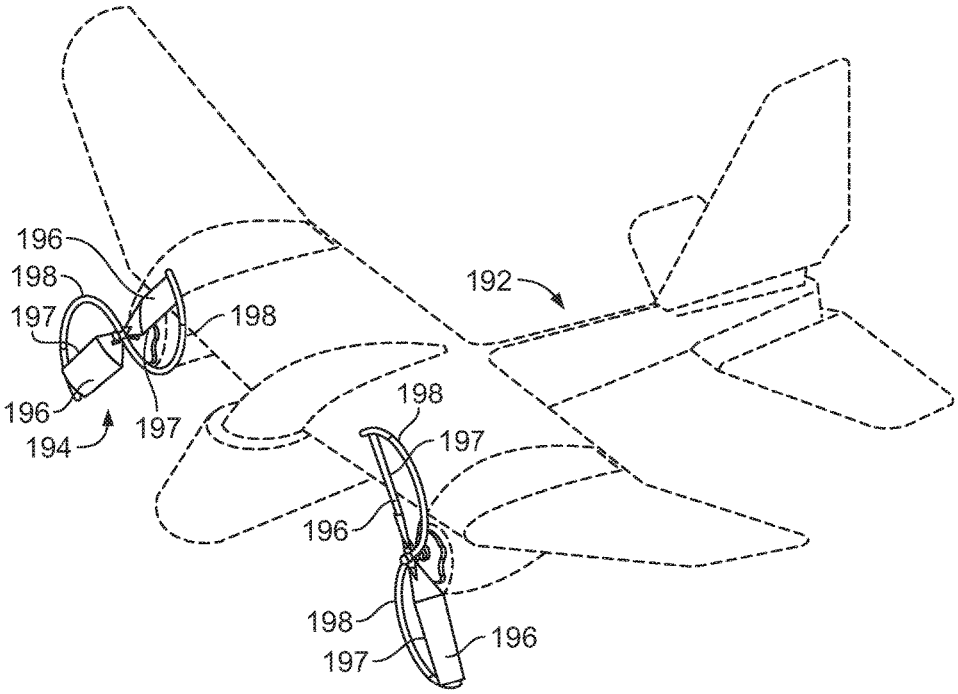
FIG. 8 Amended

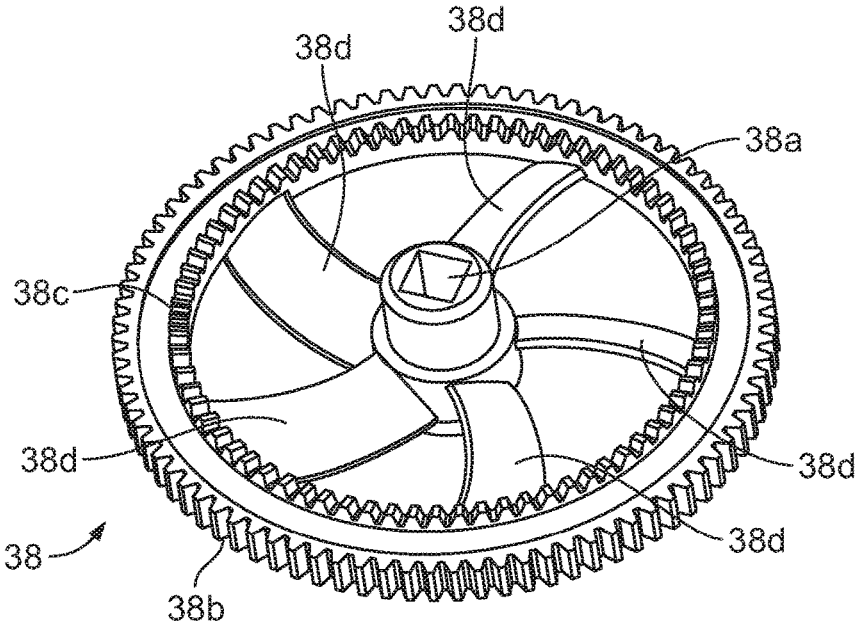
FIG. 9 Amended

PROPELLERS AND PROPELLER RELATED VEHICLES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of U.S. Provisional Patent Application having Ser. No. 60/337,670 [and filed on], *filed* Nov. 7, 2001 and claims the benefit of U.S. Provisional Patent Application having Ser. No. 60/348,891 [and filed on], *filed* Jan. 14, 2002 and hereby incorporates both provisional applications by reference.

This application further claims the benefit *to and is a continuation-in-part* of U.S. Design application having Ser. No. 29/158,996 [and filed], *filed* Apr. 15, 2002 [and], *and now U.S. Pat. No. D503,142. This application further* claims the benefit *to and is a continuation-in-part* of U.S. Design application having Ser. No. 29/158,997 [and filed], *filed* Apr. 15, 2002, *and now U.S. Pat. No. D506,178* and hereby incorporates both design [applications] *patents* by reference.

FIELD OF THE INVENTION

This invention relates generally to propellers and propeller related vehicles and more particular to vehicles, such as air, land and water vehicles, that use or incorporate propellers to create lift or as a means for propulsion, and for most aspects of the present invention relate to air based vehicles designed for the toy or hobby industry.

BACKGROUND OF THE INVENTION

While the present invention is related in part to vehicles developed in the toy and hobby industry, the present invention, as will become apparent, may easily be applicable for full sized vehicles. There are many types of vehicles that use propellers as a source of lift or as a means for propulsion. The more common types of these vehicles are air/space based vehicles such as airplanes, helicopters, or unconventional aircraft.

Air-based vehicles such as planes, helicopters and unconventional aircraft that use propellers to create and sustain lift are well known. In general such aircraft, especially aircraft designed for the toy and hobby industry, require complex programming and mechanics to control the flight path and are especially difficult to control. In most instances, controlling these aircraft to fly in a stable horizontal position takes countless hours of practice. Examples of these prior art aircraft may be found in the following U.S. Patents. U.S. Pat. No. 5,609,312 is directed to a model helicopter that describes an improved fuselage with a structure that supports radio-control components, drive train components and such, in an attempt to provide a simple structure. U.S. Pat. No. 5,836,545 is directed to a rotary wing model aircraft that includes a power distribution system that efficiently distributes engine power to the rotary wings and tail rotor system. U.S. Pat. No. 5,879,131 is directed to a main propeller system for model helicopters that are capable of surviving repeated crashes. U.S. Pat. No. 4,604,075 is directed to a toy helicopter that includes a removable control unit, which a user may plug into the toy helicopter.

These toys use at least one propeller rotating in a substantially horizontal plane to create and sustain lift. In addition these "aircraft" may have another propeller rotating at an angle from the horizontal plane to counter the torque created from the rotating horizontal propeller. Typically the second propeller is rotating in a substantially vertical plane. One problem that arises is when the propellers are rotating in the horizontal plane, variations such as wind or power fluctuations may cause the propeller blades to pitch further causing the aircraft to tip, turn, oscillate or bank. This effect may be compensated for and corrected in various ways with complicated programming and mechanics. However, as mentioned above these have a tendency to make the aircraft too expensive or too difficult to control, especially for children. The ability to even maintain horizontal stability in these aircrafts is extremely difficult.

As such a need exists to improve these aircrafts that utilize propellers to create and sustain lift to overcome the problems identified above. Such a need should be inexpensive and easy to implement. The outcome should further provide for aircrafts that are easy to control or manipulate without the need for complex linkages, servos, gyros or other electromechanical devices.

In addition to the need to improve the stability and control of these aircrafts, there is also an increased need to make such aircraft safer. Oftentimes a child or user is injured when the user comes in contact with a rotating propeller. As such there exists a further need to make the propellers safer.

SUMMARY OF THE INVENTION

A propeller related vehicle in accordance with one embodiment of the present invention is described as a helicopter having an airframe housing a motor mechanism for powering a main propeller and a tail rotor. The main propeller is attached to a main drive shaft that extends vertically through the airframe. The helicopter further includes a horizontal stabilizing means attached between the main propeller and the main drive shaft, which permits the main propeller to freely pivot about the main drive shaft independently from the airframe. As such when the main propeller is rotating and the main propeller begins to pitch, a centrifugal force created by the rotation of the main propeller, tends to pivot the main propeller about the horizontal stabilizing means in a manner that offsets the pitch such that the helicopter remains in a substantially horizontal position.

The main propeller of the propeller related aircraft may also exhibit an increased means for self-stabilizing the aircraft. In one embodiment, the main propeller may include a pair of blades extending outwardly from the horizontal stabilizing means. Each blade includes a leading edge, an end proximal to the horizontal stabilizing means, and a distal end. The main propeller also includes a safety arc attached to the proximal and distal ends of each blade and positioned in front of the leading edge of each blade. Furthermore, the safety arc has a diameter, which transitions from a relatively flat horizontal surface by the proximal end into a wider vertical surface by the distal end.

In another embodiment, the main propeller may include a pair of blades extending outwardly from the horizontal stabilizing means along a horizontal plane. Each blade has a leading edge, an end proximal to the horizontal stabilizing means and a distal end. A safety arc is also provided and attached to the proximal and distal ends of each blade and positioned in front of the leading edge of each blade. The main propeller also has a pair of flybars extending outwardly from the horizontal stabilizing means along the horizontal plane. As such when the main propeller is rotating and the main propeller begins to pitch, the flybars having an increased centrifugal force created by the rotation thereof will tend to pivot the blades about the horizontal stabilizing means in a manner that offsets the pitch such that the helicopter remains in a substantially horizontal position.

In another embodiment, the main propeller includes a crossbar joint pivotally attached to the horizontal stabilizing means. A pair of blades extends outwardly along a horizontal plane from the blade joint, wherein each blade has an end proximal to the crossbar joint and a distal end. A pair of crossbars extends outwardly from the crossbar joint along the horizontal plane. Each crossbar has an end proximally secured to the crossbar joint and an end distal thereto. A circular safety ring is secured to the distal ends of each crossbar and has pivots for receiving the distal ends of each blade. A flybar is extended outwardly both from a leading edge and a trailing edge defined in each blade. Each flybar extends along the horizontal plane, wherein when the main propeller is rotating and the main propeller begins to pitch, the flybars having an increased centrifugal force created by the rotation thereof will tend to pivot the blades about the horizontal stabilizing means in a manner that offsets the pitch such that the helicopter remains in a substantially horizontal position.

In another embodiment, the main propeller includes a blade joint pivotally attached to the horizontal stabilizing means. Two pair of blades are extended outwardly along a horizontal plane from the blade joint, such that one pair of blades is perpendicular to the other pair of blades. Furthermore each pair of blades may pivot independently of the other pair. Each blade has an end proximal to the blade joint and a distal end. A circular safety ring includes pivots for receiving the distal ends of each blade. A flybar is extended outwardly from a leading edge defined in each blade, wherein when the main propeller is rotating and the main propeller begins to pitch, the flybars having an increased centrifugal force created by the rotation thereof will tend to pivot the blades about the horizontal stabilizing means in a manner that offsets the pitch such that the helicopter remains in a substantially horizontal position.

In addition thereto the flybars may include weighted ends to increase the centrifugal force created by the rotation thereof. The main propeller described above may be used in other propeller related vehicles since each exhibits a means for stabilizing the propeller in a single plane, or since the main propellers include safety rings or arcs that decrease the likelihood a user may be injured by a rotating propeller.

Numerous advantages and features of the invention will become readily apparent from the following detailed description of the invention and the embodiments thereof, and from the accompanying drawings.

BRIEF DESCRIPTION OF THE DRAWINGS

A fuller understanding of the foregoing may be had by reference to the accompanying drawings, wherein:

FIG. 1 is an exploded view of a propeller related vehicle in accordance with the present invention illustrating a helicopter with a horizontal stabilizing means and a main propeller configured with two blades and half safety arcs in front of the leading edge of each blade;

FIG. 2 is a enlarged perspective view of the horizontal stabilizing means;

FIG. 3 is a perspective view of the helicopter illustrated in FIG. 1;

FIG. 4 is a perspective view of another embodiment of the present invention illustrating a helicopter with a main propeller configured with a pair of blades and half safety arcs and a pair of flybars extending outwardly from the center of the main propeller;

FIG. 5 is a perspective view of another embodiment of the present invention illustrating a helicopter with a main propeller configured with a pair of blades and a crossbar, and a full circular safety ring, two pair of flybars also extend outwardly from the ends of the blades, which are distal to the center of the main propeller;

FIG. 6 is a perspective view of another embodiment of the present invention illustrating a helicopter with a main propeller configured with two pairs of blades, each pair perpendicular to each other and independently pivotally attached to the helicopter and a full circular safety ring, in addition each blade includes a flybar extending perpendicularly from the ends of the blade, which is distal from the center of the main propeller;

FIG. 7 is a perspective view of one embodiment of the present invention illustrating a helicopter with a main propeller configured with a pair of blades and a pair of flybars extending outwardly from the center of the main propeller;

FIG. 8 is a perspective view of another embodiment of the present invention illustrating an airplane utilizing the main propeller configured in FIGS. 1 and 3; and FIG. 9 is a perspective view of a combo gear that permits the internal cooling of the airframe.

DETAILED DESCRIPTION OF THE INVENTION

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or the embodiments illustrated.

A propeller related vehicle, is illustrated in but one embodiment of the present invention as a helicopter 10, depicted in FIG. 1. Like a typical helicopter the present embodiment includes an airframe 12 that houses the electronics and mechanical components as well as a chassis. The chassis is preferably designed as a two piece chassis defined as an upper chassis 20 and a lower chassis 22. Attached to the lower chassis 22 are landing skids 24 such that the helicopter 10 may rest on a given surface.

The helicopter 10 includes a main propeller 14 and a tail rotor 16 as a means for correcting counter-rotation. Both the main propeller 14 and the tail rotor 16 are powered by a motorized means 18, discussed in greater detail below. The actual design, shape or length of the main propeller 14 may vary with the size and weight of the helicopter 10, such that an appropriate amount of lift is generated for takeoff and sustained flight. The tail rotor 16 rotates at a pre-determined rotation that offsets the torque created by the main propeller 14, when the main propeller 14 is rotating at a maximum revolution per minute (Max RPM). The predetermined rotation is determined upon a number of factors well known in the art.

The motorized means 18 includes a power supply 26, such as a battery pack, that powers a motor mechanism 28. The motorized means 18 is controlled through a circuit board 30.

A transmitter/receiver 34 may also be employed such that the helicopter 10 may be remotely operated. The power supply 26 is accessible through a door 32 in the lower chassis 22.

The motor mechanism 28 drives a motor pinion 36 that is meshed to a combo crown gear 38. The combo crown gear 38 is rotatably mounted to the upper chassis 20. The combo crown gear 38 is also mounted to one end of a main rotor drive shaft 40. The main rotor drive shaft 40 extends upwardly from the crown gear 38 through the upper chassis 20. The other end of the main rotor drive shaft 40 is attached to the main propeller 14 via a means for stabilizing the helicopter in a horizontal position 42 (referred to herein as horizontal stabilizing means 42) discussed in greater detail below.

As mentioned above, the tail rotor 16 is also driven by the motorized means 18. The crown portion of the combo crown gear 38 is meshed to a tail rotor pinion 60, which rotates a tail drive shaft 62 that is mounted thereto. A tail boom 66 is clamped by a boom clamp 64, or otherwise secured, to the upper chassis 20. For stability a tail bushing 68 is positioned midway within the length of the tail boom 66. The other end of the tail drive shaft 62 is mounted to a tail rotor rear pinion 70. The tail rotor rear pinion 70 is meshed to and drives a tail rotor crown gear 72, which spins a tail rotor axle 74. The tail rotor 16 is secured onto the tail rotor axle 74 such that when the tail drive shaft 62 rotates, the tail rotor 16 rotates. A tail rotor gear housing 76 is positioned to enclose the tail rotor crown gear 72, the tail rotor rear pinion 70 and the tail rotor axle 74.

The helicopter 10 may be turned on/off via a switch 78 mounted through a mounting plate 80 alongside the airframe 12 of the helicopter 10. The on/off switch 78 may also include an access cover 82 such that the switch 78 is not accidentally hit, for instance if the helicopter 10 crashes. In addition, the power supply 26 may be rechargeable through a charging jack 84. The helicopter 10 may include vents 86 to permit air to cool the motorized means 18 or power supply 26 when running. The ventilation or cooling process is further accomplished by the unique and novel combo gear 38.

As further illustrated in FIG. 9, the combo gear 38 includes a centered bore 38a that permits the combo gear 38 to mount to the [upper chassis 20] *main drive shaft 40*. The combo gear 38 also includes outside gearing 38b that meshes to the motor pinion 36 and crown gearing 38c that meshes to the tail rotor pinion 60. The combo gear 38 further includes fan blades 38d that are positioned such that when the combo gear 38 is rotated by the motor pinion 36 the fan blades 38d draw air through the vents 86 into the chassis. Thereby cooling the internal components of the propeller related vehicle.

To further stabilize the upper chassis 20, a grill 88 is positioned over the upper chassis 20 such that the grill 88 may be received by an inside area of the airframe 12, when assembled.

The horizontal stabilizing means 42 is defined by mounting the main propeller 14 on a [freely] pivotal main rotor head 44 (FIG. 2). The main rotor head 44 permits the main propeller 14 to pivot about [its center] *a pivot pin 48*. In addition, the rest of the helicopter 10 below the [freely] pivotal main rotor head 44 [can pivot as a pendulum] *pivots together about the pivot pin 48 similar to a pendulum*. The main rotor head 44[, preferably an U-shaped joint,] *is preferably U-shaped and* is secured to a rotor mount 46 that is further secured to the underside of the main propeller 14. The rotor mount 46 is pivotally attached to the main rotor head 44, via [a] *the* pivot pin 48. The main rotor head 44 is mounted to the main rotor drive shaft 40 such that when the main rotor drive shaft 40 rotates, the main rotor head 44 rotates. This causes the rotor mount 46 to spin, rotating the main propeller 14. It is important to note that it is preferably mounted such that the main propeller blades 50 are mounted parallel to the pivot [point] *pin* 48. This allows the main propeller 14 [to pivot the same direction as the blades 50, so the blades 50 can self regulate themselves] *and the blades 50 thereof to pivot about a first axis defined by the pivot pin 48 and not about a second axis non-parallel to the first axis so the blades 50 can self-regulate themselves*. The pivoting action *of the blades 50* is thus forward and backwards *relative to the first axis defined by the pivot pin 48* and not side to side.

Referring now to FIG. 3, the main propeller 14, depicted in FIG. 1, includes a pair of blades 50 with a pair of safety arcs 52 in front of the leading edges 54 of both blades 50. Each safety arc 52 starts at the center of the main propeller 14 and moves away from the leading edge 54 of the prop in either a circular or elliptical shape. The safety arcs 52 then join with the outer edge 56 of the respective blade 50. As the safety arcs 52 move outwardly toward the outer [edge] *edges* 56 of the blades 50, [it transitions] *they transition* from a relatively flat horizontal surface [into a broader, wider vertical surface. The safety arc and the widening of the safety arc are features where increasing the surface area distributes a force of any impact over a wider area; serving to protect the blades 50 upon impact] *to increase a surface area such that a force applied thereto is spread over a wider area which may assist in protecting the blades 50 during an impact*. In addition, when operated by a child the safety arc 52 prevents a child from having a hand or eye scratched by the outer edge 56 of a blade 50. In addition the tail rotor 16 may have the same configuration as the main propeller 12.

The safety arcs 52 in conjunction with the fact that the main propeller 14 is [freely] pivotally attached to the helicopter 10 provides a helicopter that is self-stabilizing[,]*;* in other words the main propeller 14 is kept in a [substantial] *substantially* horizontal position when the helicopter 10 is operating. It is well known that in true helicopter flight, as the helicopter gains airspeed, the leading edge of the main propeller facing forward and rotating to the back of the helicopter, lifts more than the opposite blade. This causes the helicopter to bank, in the unequal lift. In the present main propeller embodiment 14, the safety arcs 52 create a centrifugal force that tends to offset a pitch force exhibited by the main propeller 14 when rotating, such that the main propeller 14 has a tendency to remain in substantially the same plane. [Since the weight of the safety arcs 52] *The weight of the safety arcs 52 may* add weight to the blades 50 to provide a greater gyroscopic effect that stabilizes the main propeller 14.

When the main propeller 14 rotates, if the main propeller 14 begins to pitch, the safety arcs 52 will begin to move off of the horizontal plane. The weight of the safety arcs however, create a gyroscopic effect causing the main propeller 14 to level out by pivoting the blades 50 about the pivot pin 48 [from] *of* the horizontal stabilizing means 42. The blades 50 pivot along *with* the changing pitch of the main propeller 14 such that the main propeller 14 returns to rotating in a substantially horizontal plane *to assist in horizontally stabilizing the helicopter 10 and maintaining the helicopter 10 in substantially the same position*. [Thereby stabilizing the helicopter 10 horizontally, keeping it level and in substantially the same position.] Similarly, if the body of the helicopter 10 (below the horizontal stabilizing means 42) begins to sway the horizontal stabilizing mean 42 will similarly compensate and return the helicopter *10* to a substantially horizontal position. As such, the present invention provides a novel mechanical means for compensating for any change in the horizontal position of the helicopter without the need for expensive servos and programming.

During operation, the present invention will allow the helicopter 10 to lift straight up and maintain a hover or stationary position. The helicopter 10 may include several forms of control, starting with no control or "free flight," or it may be outfitted with electronics having a microprocessor for "preprogrammed" or "programmable" flight or it may be outfitted with a radio receiver for use with a hand held remote transmitter or it may be any combination of the above.

As mentioned above, the tail rotor 16 rotates at a predetermined rotation that offsets the torque created by the main propeller 14, when the main propeller 14 is rotating at a Max RPM. With a simple inexpensive remote control unit, a user may be able to adjust the speed of the main propeller 14. If the user decreases the speed of the main propeller 14, the tail rotor 16 will be rotating at a rate such that its counter rotation force is different during deceleration then what is required to keep the helicopter 10 from rotating at Max RPM or during acceleration. As such the helicopter 10 will begin to rotate about the main rotor drive shaft 40, providing the user with a simple means of rotating or turning the helicopter 10.

In another embodiment of the present invention, the helicopter may include various main propeller and tail rotors. Referring now to FIG. 4, a main propeller 100 is shown attached to a helicopter 98 via the horizontal stabilizing means 42. The main propeller 100 includes a pair of opposing positioned blades 50 with safety arcs 52, either elliptical or circular, in front of the leading edges 54 of both blades 52. In addition, extending outwardly from the center of the main propeller 100 is a pair of fly bars 102 with weighted ends 104. The fly bars 102 add extra stability to the main propeller 100 and also reduce the effect wind may have on the main propeller 100. When the main propeller 100 is rotating, centrifugal force pulls the weighted ends 104 of the fly-bars 102 straight out, making the main propeller 100 more stable by reducing the ease *at which* the main propeller 100 may pivot during operation. The helicopter 98, illustrated in this embodiment may also include a tail rotor 16 configured similarly to the helicopter 10 depicted in FIGS. 1-3. The helicopter 98 may also include various landing gears 106. The landing gears 106 may include [apertures] *annular members* 108 such that the helicopter 98 may be properly positioned on a launching/landing pad or base (not shown).

The base may function both to charge the power supply in the helicopter and to energize the main propeller of the helicopter to a sufficient RPM required for launching the helicopter from the launching base. The launching base may also include batteries and a timer circuit for charging the helicopter and may have a separate motor for energizing the main propeller. The charger may either be equipped to turn off after a certain amount of time or until the battery reaches a certain voltage.

Referring now to FIG. 5, in another embodiment of the present invention, a helicopter 120 may include a main propeller 122 that has a [two blade 124] *two-blade* configuration with a full circular safety ring 126 and a set of flybars 128. The full circular safety ring 126 is planar with both blades 124. The safety ring 126 is secured to the center 130 of the main propeller 122 by a pair of crossbars 132. The crossbars 132 attach to a crossbar joint 134 at the center 130 of the main propeller 122. The safety ring 126 includes pivots 136 that receive the ends of the blades 124, which are distal to the center 130 of the main propeller 122. The pivots 136 and the crossbar joint 134 permit the blades 124 to pivot independently from the safety ring 126. The set of flybars 128 is attached to the ends of the blades 124, which are proximal to the center 130 of the main propeller 122. In addition, the flybars 128 may also include weighted ends 138. Since the flybars 128 are secured to the blades 124, the flybars 128 will pivot along with the blades 124.

The flybars 128, in conjunction with the single axis pivot of the blades 124 will help keep the main propeller 122 in equilibrium when the main propeller is spinning. As mentioned above, in previous propeller embodiments, when the main propeller is rotating, the blades 124 will pivot to compensate for any banking or unequal lift forces. In addition, when spinning with the main propeller 122, centrifugal force will pull the weighted ends 138 on the flybars 128 outwardly; making the blades 124 more stable by reducing the ease *at which* the blades 124 may pivot. Additionally, even if the flybars 128 did not include weighted ends the centrifugal force would still pull on the flybars 128 themselves, increasing the stability of the main propeller 122.

In another embodiment, *as depicted in* FIG. 6, a helicopter 150 includes a main propeller 152 that has 4 pivotal blades 154 with a full circular safety ring 156 and flybars 158 attached separately to each blade 154. The blades 154 are arranged in two pairs (160 and 162), each pair (160 and 162) is set perpendicular to each other. The safety ring 156 includes four pivots 164, each pivot 164 positioned to receive an end of a blade 154, which is distal from the center 166 of the [helicopter 150] *main propeller 152*. The center 166 of the [helicopter 150] *main propeller 152* includes a double joint 168 that acts in concert with the pivots 164 such that the two pairs (160 and 162) of blades 154 may pivot independently of each other. Extending outwardly from [the leading] *a trailing* edge 170 of each blade 154 is a flybar 158, which may include a weighted end 172.

The dual-axis pivot created by the two pairs (160 and 162) of independently pivoting blades 154 helps keep the main propeller 152 in equilibrium when the main propeller is rotating. In addition when rotating, a centrifugal force pulls the flybars 158, and especially the weighted ends 172, outwardly increasing stability by reducing the amount of pivot the blades 154 may exhibit.

In yet another embodiment of the present invention, as depicted in FIG. 7, a helicopter 180 includes a main propeller 182 that includes a pair of blades 184 with a pair of perpendicular flybars 188 bisecting the blades 184 at the center 186 of the main propeller 182. Each flybar 188 may also include [weighted ends] *a weighted end* 190. When the main propeller 182 and flybars 188 rotate, the main propeller 182 may begin to pitch causing the flybars 188 to move off of the horizontal plane. The weighted ends 190 create a gyroscopic effect causing the flybars 188 to level out by pivoting about the pivot pin 48 [from] *of* the horizontal stabilizing means 42. This causes the main propeller 182 to pivot [along the flybars' 188 axis changing] *about the pivot pin 48 and change* the pitch of the main propeller 182 such that the blades 184 and the flybars 188 return to rotating in the same horizontal plane *to assist in horizontally stabilizing the helicopter 180 and maintaining the helicopter 180 in substantially the same position*. [Thereby stabilizing the helicopter 180 horizontally, keeping it level and in the same position.]

As should be readily apparent from the above description each of the main propellers described above is mounted to the horizontal stabilizing means 42, increasing the ability to keep the helicopter in a level horizontal plane during operation. However, the propellers may also be incorporated onto a helicopter that does not include the horizontal stabilizing means 42, as each of the main propellers described above, by themselves, assist in keeping a helicopter in a substantially horizontal plane.

In addition, the helicopter may or may not take the form of "traditional" helicopter styling and the technology used to make the item fly could be used in other flying toys, such as airplanes and other unconventional aircraft, such as but not limited to a vehicle using two or more [horizontal propellers. FIG. 8,] *propellers with a generally vertical orientation FIG. 8* depicts an airplane 192 that includes a [propeller 194] *pair of propellers 194 which may be* configured similarly to one of the above embodiments[, more particularly to a propeller 194 that includes]. *Each propeller 194 may include* a pair of blades 196, each [blades] *blade* including a half safety arc 198 covering the leading edge 197 of each blade 196.

In addition, the present invention is applicable to an aircraft having one or more propellers that rotate in a horizontal plane. The aircraft would typically have an airframe for housing a motor mechanism, which is used to power each propeller. Each propeller is attached to a corresponding drive shaft that extends vertically through the airframe. The aircraft further includes a horizontal stabilizing means attached between each propeller and the corresponding drive shaft, which permits the propeller to freely pivot about the corresponding drive shaft independently from the airframe. As such when a propeller that is rotating begins to pitch, the rotating propeller has a centrifugal force created by the rotation thereof that tends to pivot the propeller about the horizontal stabilizing means in a manner that offsets the pitch such that the aircraft remains in a substantially horizontal position.

From the foregoing and as mentioned above, it will be observed that numerous variations and modifications may be effected without departing from the spirit and scope of the novel concept of the invention. For example, the propellers, while shown may be used in airplanes, may find further applications in other propeller driven vehicles, either miniature or life-size, such as but not limited to water driven vehicles (such as boats and submarines), land driven vehicles (such as propeller operated cars) and other air driven vehicles (such as rockets) as well as other products that use propellers. It is to be understood that no limitation with respect to the specific methods and apparatus illustrated herein is intended or should be inferred.

We claim:

1. A *toy* helicopter having an airframe [housing, a] *housing a* motor mechanism for powering a main propeller attached to a main drive shaft that extends vertically through the airframe and for powering a tail rotor, the *toy* helicopter further comprising a horizontal stabilizing means attached between the main propeller and the main drive shaft, which permits the main propeller to freely pivot [about] *relative to* the main drive shaft independently from the airframe, [wherein when the main propeller is rotating and the main propeller begins to pitch, the rotating main propeller having a centrifugal force created by the rotation thereof will tend to pivot about the horizontal stabilizing means in a manner that offsets the pitch such that the helicopter remains in a substantially horizontal position]

*wherein the horizontal stabilizing means comprises a rotor head secured to the main drive shaft and a rotor mount mounted to the rotor head by only one pin such that the main propeller pivots about only one axis relative to the main drive shaft,*

*wherein the main propeller is pivotally supported by the horizontal stabilizing means and comprises a pair of blades extending outwardly from the rotor mount and such that the blades are mounted parallel to the pin, and*

*wherein the horizontal stabilizing means and the main propeller are arranged with one another such that the toy helicopter remains in a substantially horizontal position when a pitch of the main propeller during rotation is offset by a centrifugal force acting on the main propeller causing the propeller to pivot relative to the main drive shaft about the pin of the horizontal stabilizing means.*

2. The *toy* helicopter of claim 1, wherein the main propeller [includes] *further comprises*:

[a pair of blades extending outwardly from the horizontal stabilizing means along a single axis, each blade having] *each blade of the pair of blades having* a leading edge, a proximal end defined as an end proximal to the horizontal stabilizing means, and a distal end; and

[a safety arc attached to the proximal and distal ends of each blade and positioned in front of the leading edge of each blade] *first and second safety arcs, the first safety arc attached to the proximal and distal ends of one of the blades and the second safety arc attached to the proximal and distal ends of the other of the blades, wherein each of the safety arcs is positioned forward of a respective leading edge of the corresponding blade.*

3. The *toy* helicopter of claim 2, wherein [the safety arc has a diameter that] *each of the safety arcs* transitions from a relatively flat horizontal surface [by the] *at the respective* proximal end into a wider vertical surface [by the] *at the respective* distal end.

4. The *toy* helicopter of claim 1, wherein the main propeller includes:

[a pair of blades extending outwardly from the horizontal stabilizing means] *each of the blades of the pair of blades extending outwardly* along a horizontal plane, each blade having a leading edge, a proximal end defined as an end proximal to the horizontal stabilizing means and a distal end;

[a safety arc attached to the proximal and distal ends of each blade and positioned in front of the leading edge of each blade; and] *first and second safety arcs, the first safety arc attached to the proximal and distal ends of one of the blades and the second safety arc attached to the proximal and distal ends of the other of the blades, wherein each of the safety arcs is positioned forward of the respective leading edge of the corresponding blade; and* a pair of flybars extending outwardly from [the horizontal stabilizing means] *a central portion of the main propeller* along said horizontal plane, [wherein when the main propeller is rotating and the main propeller begins to pitch, the flybars having an increased centrifugal force created by the rotation thereof will tend to pivot the blades about the horizontal stabilizing means in a manner that offsets the pitch such that the helicopter remains in a substantially horizontal position]

*wherein the flybars and blades are arranged with one another such that a pitch of the blades is offset by an increased centrifugal force created by rotation of the*

*flybars to act on and pivot the blades about the pin of the horizontal stabilizing means to maintain a substantially horizontal position of the toy helicopter.*

5. The *toy* helicopter of claim 1, wherein the main propeller includes:

[a pair of blades pivotally] *the pair of blades being pivotally supported by the horizontal stabilizing means and* extending outwardly along a horizontal plane from the horizontal stabilizing means, each [blade] *of the blades* having an end proximal to the horizontal stabilizing means and a distal end;

[a crossbar joint that is secured to the proximal ends of the blades;

a pair of crossbars extending outwardly from the crossbar joint along the horizontal plane, each crossbar having an end proximal secured to the crossbar joint and a distal end;]

a circular safety ring secured to [the distal ends of each crossbar and having pivots for receiving] the [distal ends of each blade; and] *distal end of each of the blades; and*

[a flybar] *a first flybar and a second flybar each* extending outwardly [both] from a leading edge [and] *of a respective one of the blades and a third flybar and a fourth flybar each extending from* a trailing edge [defined in each blade] *of a respective one of the blades*, each [flybar] *of the four flybars* extending along said horizontal plane,

[wherein when the main propeller is rotating and the main propeller begins to pitch, the flybars having an increased centrifugal force created by the rotation thereof will tend to pivot the blades about the horizontal stabilizing means in a manner that offsets the pitch such that the helicopter remains in a substantially horizontal position]*wherein when the main propeller is rotating and begins to pitch, the flybars having an increased centrifugal force acting thereupon and created by the rotation will pivot the blades about the horizontal stabilizing means in a manner that offsets the pitch such that the toy helicopter remains in a substantially horizontal position.*

[6. The helicopter of claim 1, wherein the main propeller includes:

two pair of blades pivotally extending outwardly along a horizontal plane from the horizontal stabilizing means, such that one pair of blades is perpendicular to the other pair of blades, each blade having an end proximal to the horizontal stabilizing means and a distal end;

a circular safety ring having pivots for receiving the distal ends of each blade; and a flybar extending outwardly from a leading edge defined in each blade, wherein when the main propeller is rotating and the main propeller begins to pitch, the flybars having an increased centrifugal force created by the rotation thereof will tend to pivot the blades about the horizontal stabilizing means in a manner that offsets the pitch such that the helicopter remains in a substantially horizontal position.]

7. The *toy* helicopter of claim [4, 5, or 6] *4 or 5*, wherein the flybars include weighted ends to increase the centrifugal force created by the rotation thereof.

[8. The helicopter of claim 1, wherein the horizontal stabilizing means is defined as a pivotal main rotor head mounted to the main drive shaft, and a main propeller mount extending downwardly from the main propeller; the main propeller mount pivotally mounted to the pivotal main rotor head such that the main propeller may pivot about the main drive shaft.]

9. A self-stabilizing propeller *assembly* for use in [an rotary-type aircraft wherein the propeller is rotatably attached to a drive shaft and rotates in a plane, the propeller comprising:] *a toy rotary aircraft, the propeller assembly including:*

*a propeller mounted via a pin to a drive shaft for rotation in a plane and for pivotal movement about only one axis relative to the drive shaft;* a pair of blades *of the propeller* extending outwardly from each other [along a single axis] *such that each of the blades is mounted parallel with the pin*, each blade having a leading edge, a proximal end defined as an end proximal to the other blade, and a distal end; and

[a safety arc attached to the proximal and distal ends of each blade and positioned in front of the leading edge of each blade] *first and second safety arcs, the first safety arc extending forward of the leading edge of a first one of the blades and attached to the proximal and distal ends of the first one of the blades and the second safety arc extending forward of the leading edge of a second one of the blades and attached to the proximal and distal ends of the second one of the blades*, each safety arc having a predetermined weight, wherein [when the propeller is rotating the weight of the] *a weight of each of the* safety arcs creates a centrifugal force [that tends to offset] *that offsets* a pitch force exhibited by the propeller when rotating such that the propeller [has a tendency to remain] *remains* in substantially the same plane.

10. The [helicopter] *self-stabilizing propeller assembly* of claim 9, wherein [the safety arc has a diameter that] *each of the safety arcs* transitions from a relatively flat horizontal surface [by the] *at the respective* proximal end into a wider vertical surface [by the] *at the respective* distal end.

[11. An aircraft having an airfame housing a motor mechanism for powering at least one substantially horizontal orientated propeller, each propeller is attached to a corresponding drive shaft that extends vertically through the airframe, the aircraft further comprising at least one horizontal stabilizing means attached between one of the propellers, of the at least one propeller, and the corresponding drive shaft, which permits the propeller to freely pivot about the corresponding drive shaft independently from the airframe, wherein when said propeller is rotating and said rotating propeller begin to pitch, the rotating propeller having a centrifugal force created by the rotation thereof will tend to pivot about the horizontal stabilizing means in a manner that offsets the pitch such that the aircraft remains in a substantially horizontal position.]

[12. The helicopter of claim 11, wherein at least one of the at least one propeller includes:

a pair of blades extending outwardly from the horizontal stabilizing means along a single axis, each blade having a leading edge, a proximal end defined as an end proximal to the horizontal stabilizing means, and a distal end; and a safety arc attached to the proximal and distal ends of each blade and positioned in front of the leading edge of each blade.]

[13. The helicopter of claim 12, wherein the safety arc has a diameter that transitions from a relatively flat horizontal surface by the proximal end into a wider vertical surface by the distal end.]

[14. The helicopter of claim 11, wherein at least one of the at least one propeller includes:

a pair of blades extending outwardly from the horizontal stabilizing means along a horizontal plane, each blade having a leading edge, a proximal end defined as an end proximal to the horizontal stabilizing means and a distal end;

a safety arc attached to the proximal and distal ends of each blade and positioned in front of the leading edge of each blade; and a pair of flybars extending outwardly from the horizontal stabilizing means along said horizontal plane, wherein when the main propeller is rotating and the main propeller begins to pitch, the flybars having an increased centrifugal force created by the rotation thereof will tend to pivot the blades about the horizontal stabilizing means in a manner that offsets the pitch such that the helicopter remains in a substantially horizontal position.]

[15. The helicopter of claim 11, wherein the main propeller includes:

a pair of blades pivotally extending outwardly along a horizontal plane from the horizontal stabilizing means, each blade having an end proximal to the horizontal stabilizing means and a distal end;

a crossbar joint that is secured to the proximal ends of the blades;

a pair of crossbars extending outwardly from the crossbar joint along the horizontal plane, each crossbar having an end proximal secured to the crossbar joint and a distal end;

a circular safety ring secured to the distal ends of each crossbar and having pivots for receiving the distal ends of each blade; and a flybar extending outwardly both from a leading edge and a trailing edge defined in each blade, each flybar extending along said horizontal plane, wherein when the main propeller is rotating and the main propeller begins to pitch, the flybars having an increased centrifugal force created by the rotation thereof will tend to pivot the blades about the horizontal stabilizing means in a manner that offsets the pitch such that the helicopter remains in a substantially horizontal position.]

[16. The helicopter of claim 11, wherein the main propeller includes:

two pair of blades pivotally extending outwardly along a horizontal plane from the horizontal stabilizing means, such that one pair of blades is perpendicular to the other pair of blades, each blade having an end proximal to the horizontal stabilizing means and a distal end;

a circular safety ring having pivots for receiving the distal ends of each blade; and a flybar extending outwardly from a leading edge defined in each blade, wherein when the main propeller is rotating and the main propeller begins to pitch, the flybars having an increased centrifugal force created by the rotation thereof will tend to pivot the blades about the horizontal stabilizing means in a manner that offsets the pitch such that the helicopter remains in a substantially horizontal position.]

[17. The helicopter of claim 14, 15, or 16, wherein the flybars include weighted ends to increase the centrifugal force created by the rotation thereof.]

[18. The helicopter of claim 11, wherein the horizontal stabilizing means is defined as a pivotal main rotor head mounted to the main drive shaft, and a main propeller mount extending downwardly from the main propeller; the main propeller mount pivotally mounted to the pivotal main rotor head such that the main propeller may pivot about the main drive shaft.]

[19. A self-stabilizing aircraft having at least one propeller comprising:

a motor mechanism in communication with at least one drive shaft, each drive shaft corresponding to one of the propellers, of the at least one propeller, a rotor head mounted to each drive shaft; and each propeller having a propeller mount that is pivotally attached to the rotor head of the corresponding drive shaft, such that each propeller pivots about the corresponding drive shaft freely and independently from the aircraft, wherein when the propeller is rotating and the propeller begins to pitch, the rotating propeller having a centrifugal force created by the rotation thereof will tend to pivot about the corresponding drive shaft in a manner that offsets the pitch such that the aircraft remains in a substantially horizontal position.]

[20. The self-stabilizing aircraft of claim 19, wherein at least one of the propellers, includes: a pair of blades extending outwardly from each other along a single axis, each blade having a leading edge, a proximal end defined as an end proximal to the other blade, and a distal end; and a safety arc attached to the proximal and distal ends of each blade and positioned in front of the leading edge of each blade.]

[21. The self-stabilizing aircraft of claim 19, wherein at least one of the propellers, includes: a pair of blades extending outwardly from the propeller mount of said propeller; and a pair of flybars extending outwardly from said propeller mount.]

[22. The self-stabilizing aircraft of claim 19, wherein at least one of the propellers, includes: a pair of blades extending outwardly from the propeller mount of said propeller, each blade having a leading edge, a proximal end defined as an end proximal to said propeller mount and a distal end; a safety arc attached to the proximal and distal ends of each blade and positioned in front of the leading edge of each blade; and a pair of flybars extending outwardly from said propeller mount.]

[23. The self-stabilizing aircraft of claim 19, wherein at least one of the propellers, includes: a pair of blades extending outwardly from the propeller mount of said propeller, each blade having an end proximal to said propeller mount and a distal end; a crossbar joint that is secured to the proximal ends of the blades; a pair of crossbars extending outwardly from the crossbar joint, each crossbar having an end proximal secured to the crossbar joint and a distal end; a circular safety ring secured to the distal ends of each crossbar and having pivots for receiving the distal ends of each blade; and a flybar extending outwardly both from a leading edge and a trailing edge defined in each blade.]

[24. The self-stabilizing aircraft of claim 19, wherein at least one of the propellers, includes: two pair of blades extending outwardly from the propeller mount of said propeller, such that one pair of blades is perpendicular to the other pair of blades, each blade having an end proximal to said propeller mount and a distal end; a circular safety ring having pivots for receiving the distal ends of each blade; and a flybar extending outwardly from each leading edge defined in each blades.]

25. A propeller *assembly for use in toy rotary aircraft, the propeller assembly* comprising:

a pair of blades extending outwardly from each other [along a single axis], each blade having a leading edge, a proximal end defined as an end proximal to the other blade, and a distal end; [and a safety arc attached to the proximal and distal ends of each blade and positioned in front of the leading edge of each blade]

*a rotor mount extending from an underside of the pair of blades for pivotally attaching via only one pin to a rotor head secured to a main drive shaft defined by the toy rotary aircraft such that the pair of blades pivot about only one axis relative to the main drive shaft;*

*the pair of blades extending outwardly from each other such that each of the blades is mounted parallel to the pin; and*

*first and second safety arcs, the first safety arc attached to the proximal and distal ends of one of the blades and the second safety arc attached to the proximal and distal ends of the other of the blades, wherein each of the safety arcs is positioned forward of the respective leading edge of the corresponding blade.*

26. The propeller *assembly* of claim 25, wherein [the safety arc has a diameter that] *each of the safety arcs* transitions from a relatively flat horizontal [surface by the] *surface at the respective* proximal end into a wider vertical surface [by the] *at the respective* distal end.

27. The propeller *assembly* of claim 25 further comprising a pair of flybars extending outwardly from the proximal ends of the blades.

28. [As is claimed in claim 1 or claim 11] *The toy helicopter of claim 1* further comprising a means for internally cooling the airframe defined by [having] a plurality of vents positioned in the airframe and a combo gear in communication with the motor mechanism, the combo gear having a plurality of cooling blades positioned such that when the combo gear rotates the cooling blades draw air through the plurality of vents into the airframe.

[29. The aircraft of claim 19 wherein the aircraft further includes an airframe housing the motor mechanism, and a means for internally cooling the aircraft defined by having a plurality of vents positioned in the airframe and a combo gear in communication with the motor mechanism, the combo gear having a plurality of cooling blades positioned such that when the combo gear rotates the cooling blades draw air through the plurality of vents into the airframe.]

*30. The toy helicopter of claim 1 further comprising:*

*a circuit board in communication with the motor mechanism configured to control the motor mechanism; and a transmitter/receiver in communication with the circuit board.*

*31. The toy helicopter of claim 30, further comprising a power supply to power the motor mechanism and a charging jack through which the power supply is rechargeable.*

*32. The toy helicopter of claim 1, wherein the rotor head is a U-shaped element.*

* * * * *